United States Patent [19]
Akeel

[11] Patent Number: 5,293,107
[45] Date of Patent: Mar. 8, 1994

[54] MOTORIZED ROTARY JOINT AND METHOD OF CONSTRUCTING A MODULAR ROBOT UTILIZING SAME

[75] Inventor: Hadi A. Akeel, Rochester Hills, Mich.

[73] Assignee: FANUC Robotics North America, Inc., Auburn Hills, Mich.

[21] Appl. No.: 22,000

[22] Filed: Feb. 24, 1993

[51] Int. Cl.$^5$ .................. B25J 9/00; H02K 5/167
[52] U.S. Cl. .................. 318/568.11; 318/568.21; 310/83; 901/25; 901/28
[58] Field of Search .......... 318/568.1–568.23, 318/8; 395/80–99; 901/3, 7, 9, 13, 15–23, 30–47, 29; 76/417, 479 R; 73/862.042, 862.04, 862.05, 471 XY; 414/744 R, 730, 2, 739, 753, 744 A, 755

[56] References Cited

U.S. PATENT DOCUMENTS

| | | |
|---|---|---|
| 3,239,699 | 3/1966 | Ferrary . |
| 4,402,234 | 9/1983 | Malarz et al. ............ 74/417 |
| 4,577,127 | 3/1986 | Ferree et al. ............ 310/83 |
| 4,589,816 | 5/1986 | Eberle et al. ............ 901/28 X |
| 4,645,409 | 2/1987 | Gorman ............ 901/29 X |
| 4,678,952 | 7/1987 | Peterson et al. ............ 901/29 X |
| 4,690,010 | 9/1987 | Matsumoto et al. . |
| 4,702,668 | 10/1987 | Carlisle et al. ............ 901/25 X |
| 4,738,576 | 4/1988 | Eberle et al. ............ 901/28 |
| 4,850,457 | 7/1989 | Taig . |
| 4,904,148 | 2/1990 | Larsson . |
| 4,907,467 | 3/1990 | Toyoda et al. ............ 901/23 X |
| 4,918,344 | 4/1990 | Chikamori et al. . |
| 5,069,524 | 12/1991 | Watanabe et al. . |
| 5,155,423 | 10/1992 | Karlen et al. ............ 318/568.11 |
| 5,203,748 | 4/1993 | Sawada et al. ............ 901/25 |

Primary Examiner—Paul Ip
Attorney, Agent, or Firm—Brooks & Kushman

[57] ABSTRACT

A motorized rotary joint for robots integrates a joint bearing with a power transmission, such as a planetary type speed reducer, and provides a large central hole for passing electric and service lines therethrough. The rotary joint includes a built-in rotor and stator arrangement within the same joint housing structure, thus allowing the electric motor to share the same bearings and housing structure with the speed reducer. Preferably, the rotor also carries planets of the reducer and the stator is either integral or coupled to a housing of the reducer. The rotary joint also accommodates an encoder, a circuit board having electronic components thereon and a built-in brake to provide a totally integrated, intelligent rotary joint. A method for constructing a modular robot using the rotary joint is also provided, wherein several such rotary joints are coupled to simple structural elements by means of bolted interfaces to construct a multi-joint robot of an articulated structure. Such a modular robot has low cost, is easy to maintain and service, and can be readily and speedily constructed and reconfigured from integrated modular components.

12 Claims, 10 Drawing Sheets

MOTORIZED ROTARY JOINT AND METHOD OF CONSTRUCTING A MODULAR ROBOT UTILIZING SAME

CROSS-REFERENCE TO RELATED APPLICATION

This application is related to U.S. application Ser. No. 08/021,999 entitled "Planetary Type Speed Reducer Having Compound Planets And Method Of Constructing Such Planets" having the same filing date and assignee as the present invention.

TECHNICAL FIELD

This invention relates to motorized rotary joints and, in particular, to motorized hollow rotary joints for robots which provide bearing support and speed reduction.

BACKGROUND ART

Articulated arm robots have rotary joints that include supporting bearings, and speed reducers connected to prime movers such as electric motors. Position feedback for the joint is usually provided by resolvers or encoders connected either to the motor shaft or to one of two arms that interface at the joint. On some joints brakes are required, usually on the high speed motor side of the reducer, to hold the robot arms from falling under gravity. When such components are utilized as independent components, cost is associated with the use of multiple bearing sets in the joint, motor, encoder, and/or brake. Additional cost is associated mechanical interfaces and couplings between the components; the joint also becomes bulkier and loses its modularity.

Occasionally some components are integrated into fewer modules. For example, servo motors may include an encoder and/or a brake as part of one motor module. This simplifies the assembly and maintenance of the robot and reduces its overall size and cost. Direct drive motors do not need reducers, but are limited to relatively low torque applications. Some other modules integrate the joint bearing with the speed reducer, such as the commercially available Cycloidal and Harmonic drive speed reducers; by adding a motor-brake-encoder module, a robot joint can be built with only two modules.

While speed reducers have been used extensively for robot joints, they have not fully supported the particular needs of robot construction. For example, it is desirable that the robot joint be hollow to pass cables and service lines through the joints from a base to serially connected joints of the robot arm and finally to its end effector. It is also desirable to avoid the duplication of bearings at the joints wherein the robot joint, the speed reducer, and the motor have their own independent bearings.

Robots are also subjected to occasional overloads resulting from interference with peripheral equipment. Such interferences could damage the robot and render it inoperable unless the robot joints and reducers have inherently high overload carrying capacities. Furthermore, the robot operation under tight controls demands a robot joint having minimal backlash and high stiffness. Robot construction also benefits from the integration of components to simplify manufacturing, assembly, and maintenance and reduce robot cost.

Some commercial speed reducers offer some of these advantages. For example, rotary vector reducers, known as RV reducers, and harmonic drives can be integrated into the robot joints and share common bearings. RV reducers also have low backlash and high overload carrying capacity and can be provided with a small center hole. However, the RV reducer is heavy in weight, costly, and does not offer a hollow center core large enough to be of appreciable value. Harmonic Drives have excessive backlash, low overload capacity, and, do not provide a hollow center. Both drives have very limiting motor mounting options. Custom reducers, utilizing gear trains, can be built to provide the required characteristics but at undesirably high costs or with excessive compliance.

U.S. Pat. No. 4,904,148 to Larsson discloses a robotic arm for an industrial robot which includes joints appearing to have a cable passage therethrough.

U.S. Pat. No. 5,069,524 to Watanabe et al discloses a robotic hand and optical fiber connector coupling assembly having passages for the optical fiber cables and various pipes.

U.S. Pat. Nos. 4,918,344, 4,850,457, 4,690,010 and 3,239,699 to Chikamori et al, Taig, Matsumoto et al, and Ferrary, respectively, disclose combined electric motor and speed reducer mechanisms.

Consequently, it is highly desirable to have a single module that integrates all of the components of a rotary joint, such as bearings, motor, speed reducer, brake, and encoder. Such a joint is believed to be disclosed in a pending patent application owned by NASA and having inventors John M. Vranish, Paul W. Richards and Peter D. Spidaliere.

Such module can be produced as a unit at lower cost, have fewer components with high reliability and a compact package. It allows robots to be built more expeditiously, have low maintenance, and be of lower overall cost.

In general, it is desirable that such rotary joints are inherently compact and light weight, have built in encoders and brakes, be capable of accommodating variations in motor mounting locations, and have speed reducers of low backlash that provide optional speed reducing ratios, high overload capability and a large hollow center. An optimum robot joint would integrate in a single module all such desirable joint elements and functions and have a simple mechanical interface at two surfaces for coupling to two adjacent robot arms, or other purely structural parts.

SUMMARY OF THE INVENTION

An object of the present invention is to provide a motorized rotary joint that integrates the joint bearing and a speed reducer having low backlash, high overload capacity, and ability to provide for a relatively large central, through hole.

Another object of the present invention is to provide such a rotary joint that allows several optional attachment locations for the coupling of a motor module to the speed reducer.

A further object of the present invention is to provide a robot joint module that integrates a motor, speed reducer, a brake, an encoder and a circuit board having electronic components thereon in a structure supported by a common set of bearings.

Yet still another object of the present invention is to provide a self-powered robot joint that includes the joint bearings, a motor, and a speed reducer.

Yet still another object of the present invention is to provide an intelligent, self-powered robot joint that includes the joint bearings, a motor, a speed reducer and a circuit board having electronic components which provide control and communication capabilities.

Another object of the invention is to provide a method for constructing modular robots from such joint modules and structural components only.

In carrying out the above objects and other objects of the present invention, a motorized rotary joint is provided for driving a load coupled thereto. The rotary joint includes a cylindrical power transmission having a central hole, a motor in driving engagement with the power transmission for driving the power transmission and a hollow housing having an outside dimension and an inside dimension. The housing includes first and second housing parts for housing the power transmission and the motor. One of the first and second housing parts is adapted to be coupled to the load. The joint also includes a first set of bearings disposed between the first and second housing parts for allowing relative rotary movement between the first and second housing parts to drive the load and a second set of bearings disposed within the housing for rotatably supporting the power transmission and the motor. The rotary joint provides a central hollow core for passing service lines therethrough. The inside dimension of the housing is relatively large in relation to the outside dimension of the housing.

Further in carrying out the above objects and other objects of the present invention, an intelligent motorized rotary joint is provided for driving a load coupled thereto. The rotary joint includes a cylindrical power transmission. A motor is in driving engagement with the power transmission for driving the power transmission. A circuit board having electronic components thereon receives electrical power and control signals and driving the motor in response thereto. The joint also includes a housing having first and second housing parts for housing the power transmission, the motor and the circuit board. One of the first and second housing parts is adapted to be coupled to the load. The joint includes a first set of bearings disposed between the first and second housing part for allowing relative rotational movement between the first and second housing parts to drive the load and a second set of bearings disposed within the housing for rotatably supporting the power transmission and the motor.

Still further in carrying out the above objects and other objects of the present invention, a method for constructing a modular robot having at least one axis of rotation is provided. The method includes the steps of providing a rotary joint as described above for each axis of rotation and providing a hollow structural module having a wall with a hole extending therethrough for each rotary joint. The method also includes the steps of aligning the hole of the structural module with the central hollow core of its corresponding joint for passing service lines through each aligned hole and central hollow core and securing each structural module to its corresponding rotary joint.

Preferably, the power transmission is a planetary-type speed reducer and the motor is an electric motor having a rotor which is also rotatably supported by the second set of bearings and carries planet gears of the reducer.

Also, preferably, the joint is capable of housing a brake and an encoder for providing a feedback signal.

With the above objectives in mind, the invention provides a motorized robotic rotary joint that is:
supportive of the needs of efficient robot arm construction;
adaptable to direct mounting within the robot arm;
inherently capable of providing a large hollow in its central core in relation to its outside dimension;
inherently compact and light in weight in relation to its load carrying capacity;
capable of accommodating variations in motor mounting locations;
capable of providing multiple speed reducing ratios within the same housing with a minimum of modifications;
inherently capable of withstanding high overloads; and Other objects of the invention are to provide:
a robot having hollow joints with built-in planetary gear speed reducers;
an integrated motor-speed reducer construction, thus providing a motorized joint having high torque output in a compact, low cost package;
an integrated motorized robot joint having a hollow center, a joint bearing and a motorizing element all in one compact package;
a motorized robot joint having a hollow center, a joint supporting bearing, a motorizing element, and a feedback encoder all integrated into one compact package; and
an intelligent motorized robot joint having a hollow center, a joint supporting bearing, a motorizing element, a circuit board having electronic components thereon, a feed-back encoder, and a brake, all integrated into one compact package.

In carrying out the above objects and other objects, features and advantages of the present invention, the invention preferably includes the following supporting features:

1. Planetary gearing of the nutating type; thus providing compactness, cylindericity, light weight, and high speed reduction ratios between two adjacent gears.

2. A first stage speed reducing arrangement for driving the carrier from a motor shaft with variable ratios; thus allowing the speed reducer to have multiple ratios within the same enclosure with a minimum of modification.

3. Sealing arrangement between parts moving at relatively low speeds;thus allowing long term lubrication and long life, especially for the high speed reducer parts.

4. Mounting provisions for direct coupling between the reducer, the motor, and the load; thus allowing the robot joint to be compact, light weight and of low cost by avoiding duplication of parts between the reducer, the motor and the load structures.

5. Packaging the reducer in a cylindrical form most suitable for internal mounting inside rotary robot joints in a minimum of space; thus providing compactness and efficient space utilization.

6. Using conventional gear components which are mass producible at low cost; thus providing a reducer of inherently low cost in relation to its performance features.

7. Integrating a motor stator into the speed reducer housing and a rotor into the planet carrier; thus forming an integral motorizing element that shares the same structure and bearings with the reducer in a robot joint.

8. Integrating an encoder element between the motor stator and the motor rotor, or two other relatively moving elements of the joint; thus providing positional feedback for motor commutation and positioning.

9. Integrating a circuit board having electronic components thereon within the joint housing to provide motor control and data communication capability to the joint.

10. Integrating a friction brake element between two housing elements moving relatively, and preferably at high speed; thus providing joint braking ability.

11. Providing mechanical interfaces on two structural housings of the joint for coupling to two adjacent robot arms; thus allowing a robot to be constructed expeditiously from joint modules and structural arm elements.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1A:
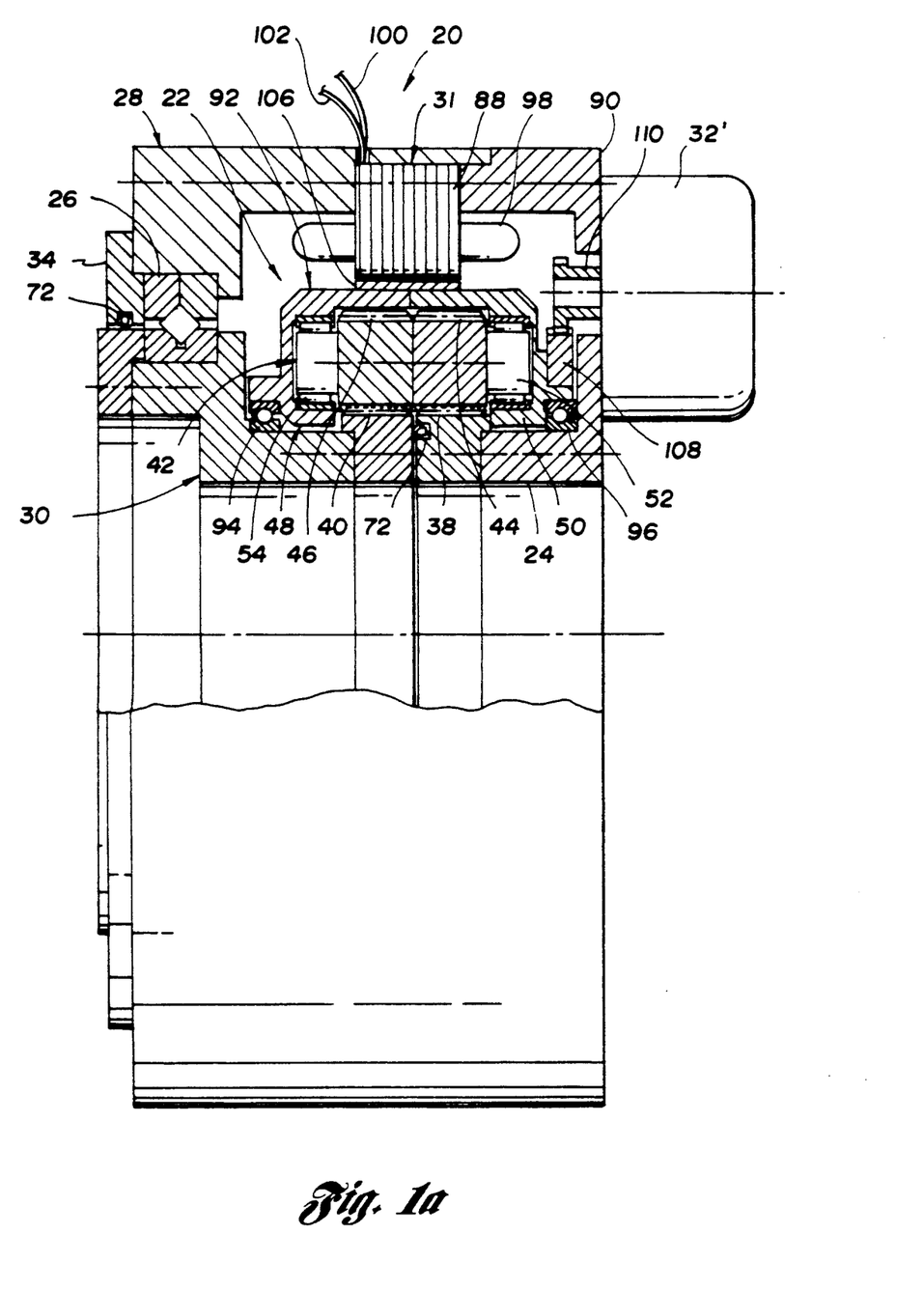
FIG. 1a is a sectional half view of a first embodiment of a motorized rotary joint constructed in accordance with the present invention illustrating a brake and/or an encoder and utilizing external-type gears.

Referring now to the drawing figures, there is illustrated in FIG. 1a a first embodiment of a motorized rotary joint, generally indicated at 20, constructed in accordance with the present invention. The rotary joint 20 includes an electric motor generally indicated at 31. The rotary joint 20 generally integrates a speed reducer, generally indicated at 22, having a hollow center 24 with bearings 26 and two structural first and second housing parts, generally indicated at 28 and 30, respectively, of a housing.

Figure 3:
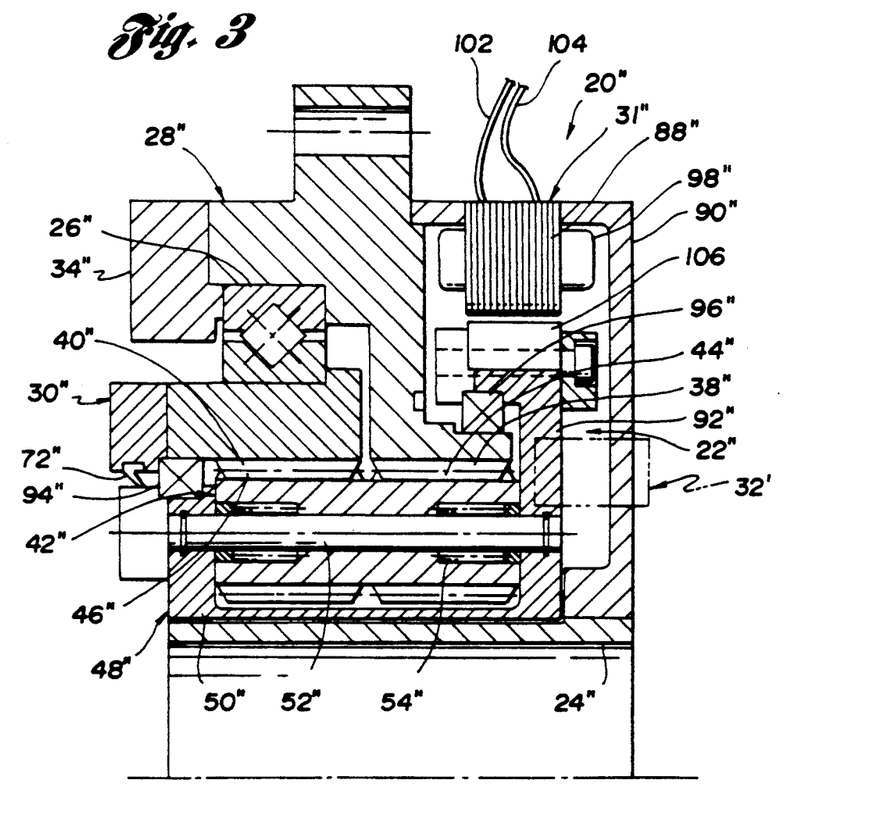
FIG. 3 is a sectional half view of another embodiment of the rotary joint including internal-type gearing.
Figure 5:
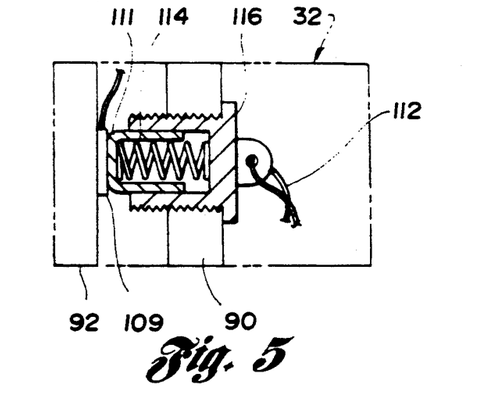
FIG. 5 is a sectional schematic view illustrating a slip ring set and its location within the rotary joint of FIG. 3.
Figure 6:
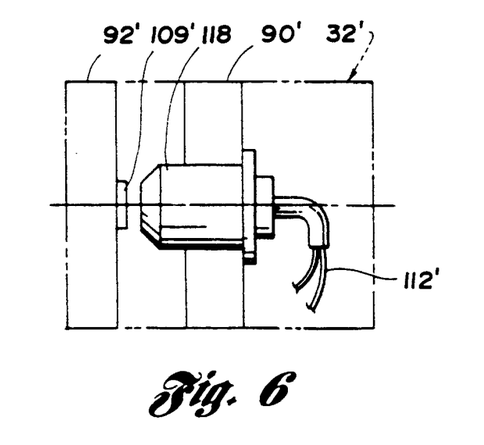
FIG. 6 is a side elevational schematic view illustrating an encoder and its location within the rotary joint of FIG. 3.
Figure 7:
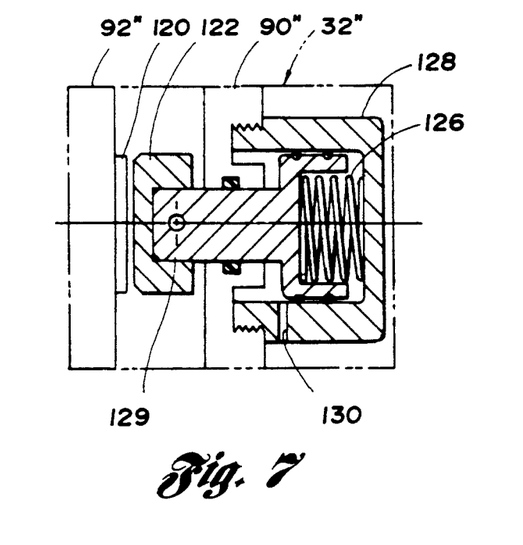
FIG. 7 is a sectional schematic view illustrating a braking element and its location within the rotary joint of FIG. 3.
Figure 8:
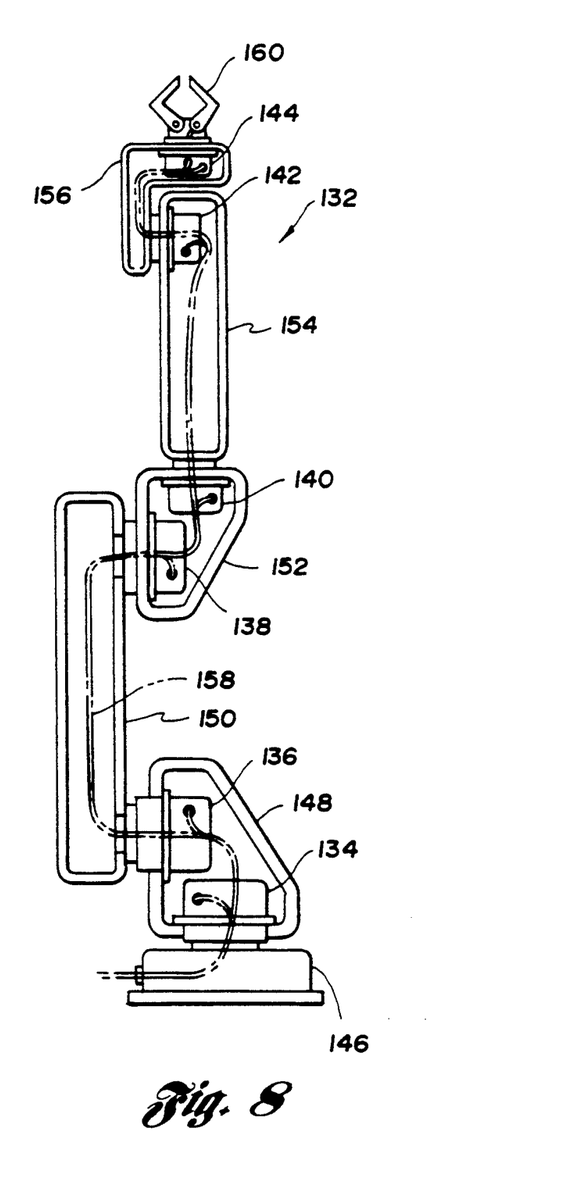
FIG. 8 is a side, broken away view of a modular robot constructed in accordance with the present invention illustrating the location of the rotary joints within their structural members and cable bundles in phantom.

There is illustrated in FIG. 3 another embodiment of the present invention, wherein a rotary joint 20" also integrates a motor 31". FIGS. 5 through 7 also shows the integration of a slip ring set, a motor encoder, and a brake (all generally indicated at 32, 32' and 32", respectively, by phantom lines) into the rotary joints 20 and 20".

The method of the invention is described in relation to FIGS. 8, 9a through 9k and 10a through 10f showing some basic robot modules and some typical robot configurations constructed from such robot modules.

Referring again to FIG. 1a, the rotary joint 20 includes the first housing part 28 rotatably mounted to the second housing part 30 by means of the bearing 26 and retained in position relative to each other by means of a retainer 34 and secured by a plurality of bolts (not shown). The first housing part 28 is coupled to a reaction gear 38 by fasteners (not shown). The gear 38 is adjacent to an output gear 40 which is likewise coupled to the second housing part 30 by fasteners (not shown). Gears 38 and 40 are of the external gear type.

The speed reducer 22 includes a plurality of compound gear planets, generally indicated at 42. Each gear planet 42 has two sections 44 and 46 which engage the teeth of the external gears 38 and 40, respectively. Only one gear planet 42 is shown.

The gear planets 42 are supported by a carrier assembly, generally indicated at 48. The carrier assembly 48 includes a spool-shaped carrier 50 which is U-shaped in cross-section, axles 52 and bearings 54. The axles 52 extend between side flanges of the carrier 50 and the bearings 54 rotatably support each gear planet 42 on its axle 52. The carrier assembly 48, in turn, is rotatably supported on the second housing part 30 by means of bearings 94 and 96.

The robot joint 20 also includes seals 72, preferably mounted between parts integral to or attached to the first and second housing parts 28 and 30 to prevent the leakage of lubricants necessary for the operation of the gearing. Additional seals may be conventionally added, between the carrier 92 and housing parts 28 and 30 to keep the motor 31 dry if desired.

FIG. 1a shows the bearing 26 located external to the gear planets 42. The rotary joint 20 of FIG. 1a is a preferred embodiment when the load carrying capacity and rigidity of the bearing 26 is to be maximized in relation to the torque output of the planetary reducer 22.

The motor 31 includes stator elements 88, which are attached to the first housing part 28 by means of a retaining plate 90. The motor 31 also includes a rotor or rotor elements 92 which are part of the carrier assembly 48.

The motor 31 further includes an energizing coil 98 which is supplied with electric current through electric wire leads 100 and 102, and which interacts with members 106 of the rotor elements 92. The members 106 may be permanent magnets as is conventional for electric motors.

FIG. 3 shows another embodiment of the invention in the form of a compact robot rotary joint 20" with an integrated motor 31". The same or similar components to the components of the first embodiment have the same reference numeral but with a double prime designation. The embodiment of FIG. 3 shows planetary gearing of the internal type.

Obviously, other types of electric motors are well known to those skilled in the art and can be utilized within this same relative arrangement between the stator 88 and the rotor 92 of FIG. 1a. For example, instead of a permanent magnet rotor, wound rotors may be used in which case instead of magnets, the members 106 are electric conductors 106''' as illustrated schematically in FIG. 1c. The electric conductors may be passive or externally energized by an electric current. The same or similar components of the components of the first two embodiments have the same reference numeral but have a triple prime designation.

The current may be communicated to the rotating rotor by induction through the stator winding or by means of the slip ring set 32 of FIG. 5. The slip ring set 32 includes a conductive annular ring 109, which is mounted to the rotor 92 and slips by a brush 111 which is biased by a spring 114 contained within a mounting member 116 threadingly secured to and extending completely through the retaining plate 90. The brush 111 is supplied electricity through a conductive wire 112 as illustrated in FIG. 5. Two such sets are usually required.

Figure 1B:
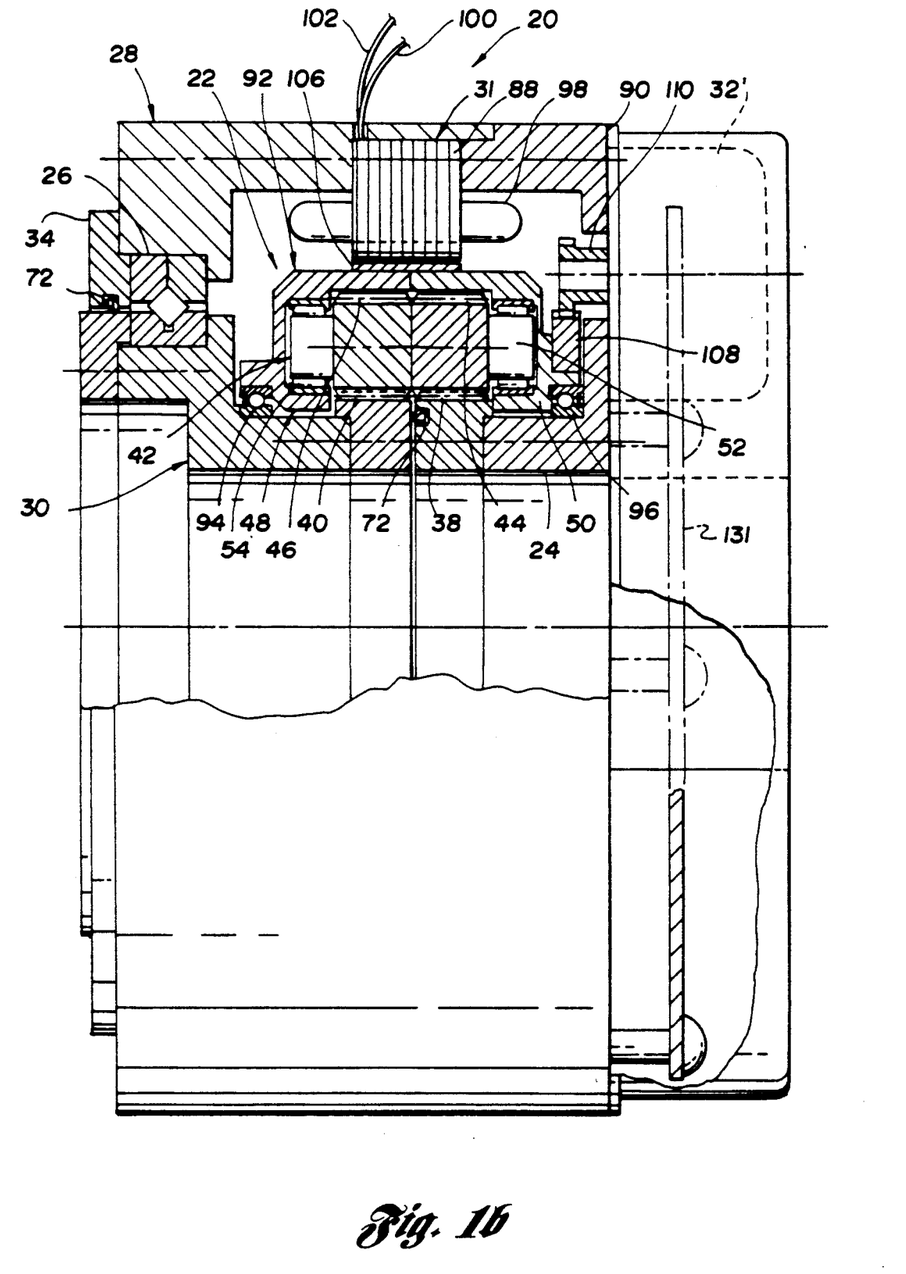
FIG. 1b is a sectional view similar to FIG. 1a but illustrating a circuit board of the present invention.
Figure 1C:
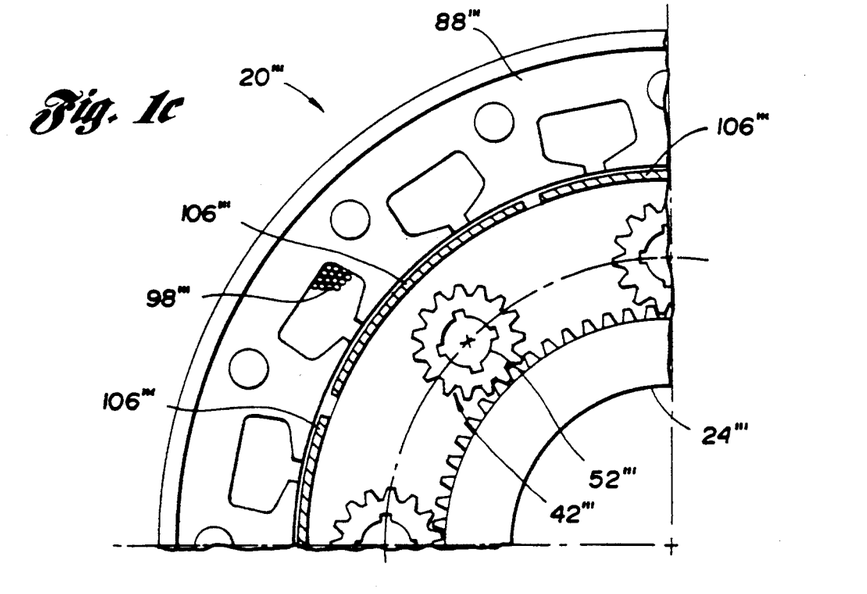
FIG. 1c is a sectional quarter end view of the rotary joint of FIG. 1a illustrating gear planets and other gearing.
Figure 2:
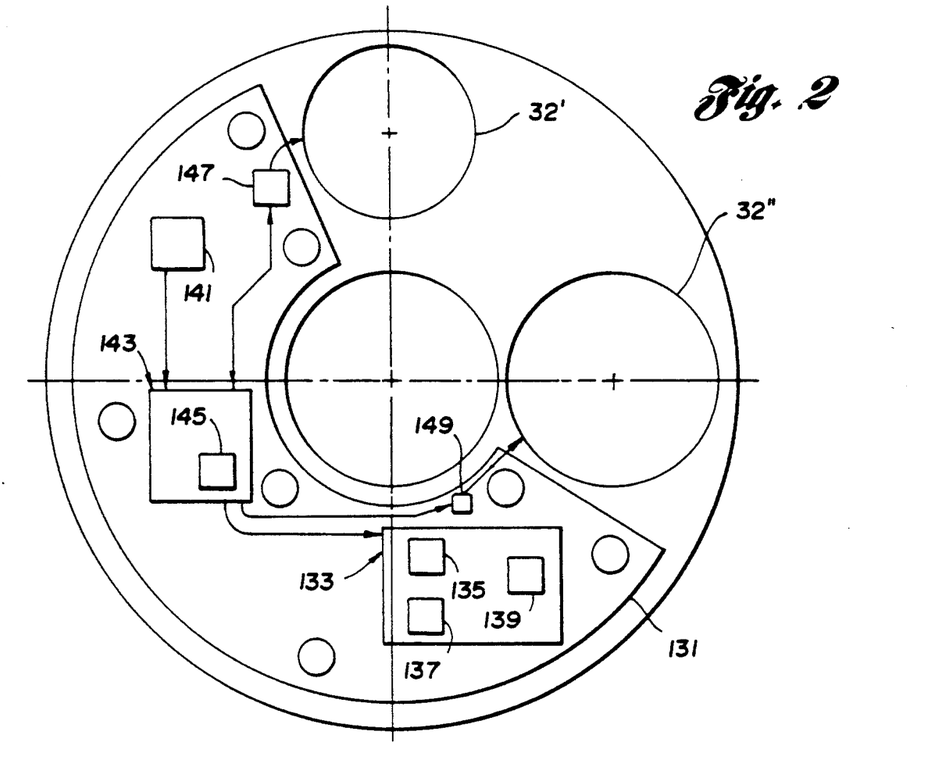
FIG. 2 is an end view of the rotary joint of FIG. 1b with electronic components illustrated schematically on the circuit board.

The invention also accommodates an encoding arrangement such as shown in FIGS. 6 and 2 in addition to the slip ring set 32. The encoder 32' may mount in a location similar to that of the slip ring set 32 between a rotor 92' and a stationary retaining plate 90'. A ring 109' may comprise a reflecting ring with radial encoding markings inscribed on it as is customary for optical encoders or the ring 109' may comprise a ferritic ring serrated radially as may be found in magnetic encoding elements. An energizer/reader 118 may be a proximity pick-up that senses magnetic pulses from the ferritic ring, or a combined laser diode emitter and photovoltaic cell receiver for an optical encoder. The encoder 32' provides a positional signal that is usually utilized in locating the motor's rotor relative to its stator. Such signal may also be used to provide winding commutation in AC servo motors which do not have slip ring sets. In FIG. 1b, a conventional rotary encoder 32' is shown supported on retainer plate 90 and having geared engagement between its pinion 110 and gear 108 that is integrally coupled to the carrier 92.

The motor elements described above are those of an electric motor. However, other types of motors can also be accommodated. For example, the stator element 88 and the coil 98 can be replaced by the housing of a pneumatic or hydraulic motor, and the rotor 92 can be replaced by a vane-type piston of such a motor. Both motor components could remain positionally related to each other by means of a mounting bearing such as the mounting bearing 26" in FIG. 3. Pneumatic and hydraulic motors do not require commutation, but utilize an encoder signal for positioning its piston and indicating the relative movement of the joint housing parts.

Furthermore, the invention may accommodate a braking element at a similar location generally indicated as 32" in FIGS. 7 and 2 in addition to the slip ring set 32 and the encoder 32'. The motion of a rotor 92" may be effectively braked by friction between a wear ring 120 and a brake pad 122 biased against each other by means of a piston 129 and spring 126 sealingly assembled inside a fluid activated cylinder 128 and a retaining plate 90". The cylinder 128 is threadedly secured to the retaining plate 90" and the piston 129 extends through the retaining plate 90".

In normal operation, pressurized fluid, such as air or oil, is allowed through a port 130 in a side wall of the cylinder 128 to retract the piston 129 thus compressing the spring 126, hence also retracting the pad 122 away from the wear ring 120, and allowing the carrier 50" to rotate freely.

Referring now to FIGS. 1b and 2, the invention may accommodate at least one printed circuit board 131 having electronic components thereon for receiving electrical control signals and controlling the motor in response to the control signals. The printed circuit board 131 has a motor drive circuit, generally indicated at 133, including a power amplifier 135, and a motor commutating circuit 137 connected to a wire 112 of FIG. 5. The drive circuit 133 also includes a motor servo control circuit 139 for controllably driving the motor in response to circuit control signals. The circuit board 131 also has a communication circuit 141 to receive digital electrical control signal commands from external programming and control devices (not shown).

The communication circuit 141 generates corresponding command signals to a programmed microcomputer, generally indicated at 143. The microcomputer 143 includes a digital data storage medium 145 for storing digital data and commands.

The circuit board also includes circuits 147 and 149 to allow the microcomputer 143 to communicate with the encoder 32 and the brake 32", respectively.

For high ratio planetary reducers of the type described herein, the number of teeth of the reaction gear 48 may differ only slightly, usually by 1 to 5 teeth, from those of the adjacent output gear 40. When gears of the same module are used, the gear sections 44 and 46 can be identical. However, the gear sections 44 and 46 must be assembled on the axle 52 such that their teeth are not necessarily aligned with each other but with the teeth of the mating gears 38 and 40, respectively.

Assuming that $Z_1$, $Z_2$, $Z_3$, and $Z_4$ equal the number of teeth of the gears 38 and 40 and the sections 44 and 46, respectively, the total reduction ratio, R, of the planetary reducer 20 is the ratio between the rotational speed of the carrier 50 to that of the output gear 40, where, $R = 1/(1 - Z_4 Z_1 / Z_2 Z_3)$; and, $R = 1/(1 - Z_1/Z_2)z$ when $Z_3 = Z_4$. Accordingly, a high ratio is attained when $Z_1/Z_2$ approach 1.0 or when $Z_1$ approaches $Z_2$.

For example, assuming $Z_2 = 100$ and $Z_1 = 99$, then, $R = 100$ and the teeth of gears 38 and 40 can be aligned only at one location, hence, only one single-gear planet, i.e., having straight teeth that straddle booth gears 38 and 40, can be used.

When $Z_1=98$, then, $R=50$ and two single gear planets can be used. A small difference between $Z_1$ and $Z_2$ allows only an equally small number of single gear planets to engage both of gears 38 and 40 when their teeth are aligned. To allow the reducer 20 to transmit higher torque and power, more planets must be used than is allowed by the alignment of the teeth of gears 38 and 40.

Compound planets having two parts of angularly shifted teeth allow as many planets to be used as can be fitted around a sun gear or inside an internal gear. Compound planets are also required when $Z_2$ and $Z_4$ are not equal since a common planet cannot be cut with different teeth in each of its gears unless they are widely separated from each other, in which case the reducer 20 would increase objectionally in length.

Figures 4A, 4B:
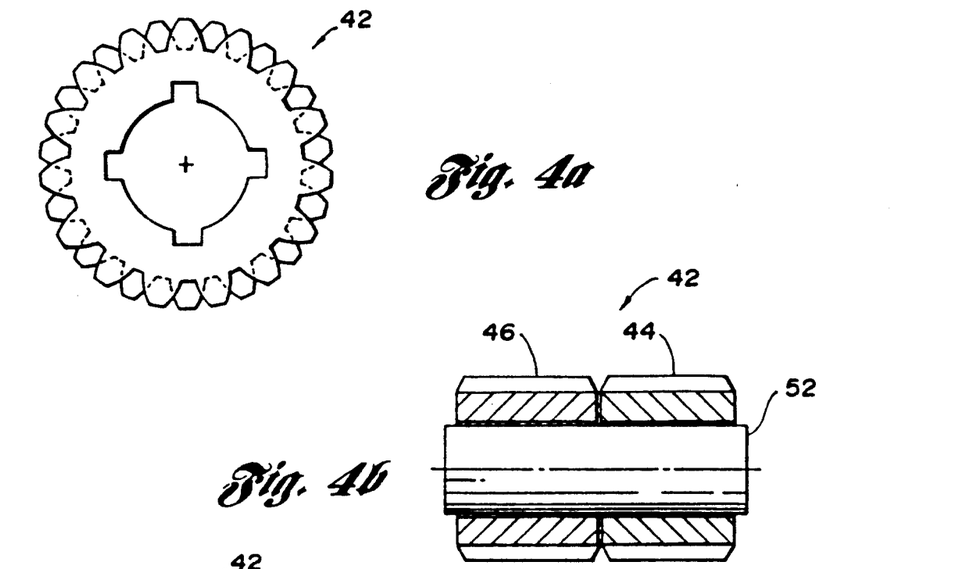
FIG. 4a is an end view of a gear planet with ½ pitch shift.
FIG. 4b is a side elevational view of a bonded gear planet.
Figures 4C, 4D:
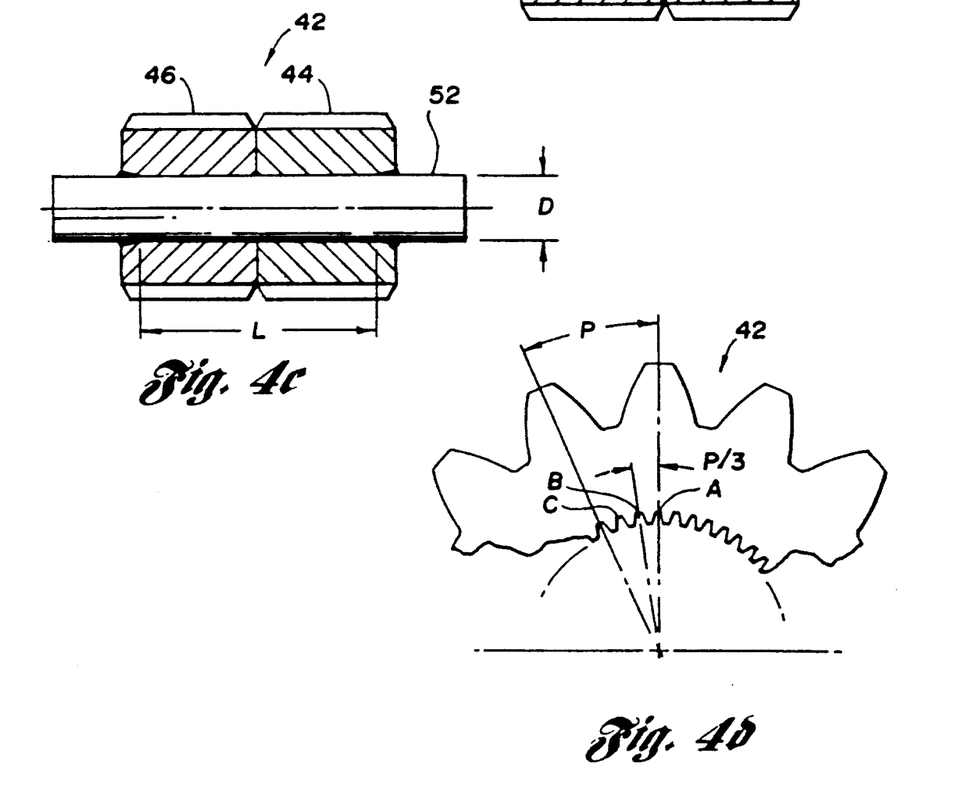
FIG. 4c is a side elevational view of a welded gear planet.
FIG. 4d is a half end view of a gear planet having a fine pitch spline.
Figure 4E:
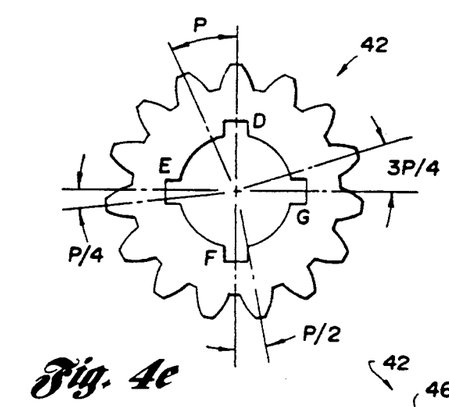
FIG. 4e is an end view of a gear planet illustrating orientation of its teeth and guideways.

For example, for a difference $Z_2-Z_1=s$, and $Z_1$ and $Z_2$ are, preferably, multiple of s, gears 38 and 40 will have their teeth aligned at s locations, where s number of equally spaced single gear planets can be used. If 3s equally spaced planets are used, there would be s similar planet groups; ⅓ of the planets would be single gear planets; ⅓ would have compound construction with one part phase shifted angularly by p/3 from its adjacent part; and ⅓ will be angularly shifted by 2p/3; where p is the angular pitch between two adjacent planet teeth, as shown in FIG. 4e.

In general, if there are N equally spaced planets, and N is a multiple n of s, there will be s similar planet groups each containing n=N/s different compound planets having angular shifts of ip/n, where, $i=1,2 \ldots ,n$. If neither N, $Z_1$, nor $Z_2$ are multiples of s, all N planets could be different and may not be similarly grouped.

METHODS OF CONSTRUCTION OF COMPOUND PLANETS

Since compound planets of two parts or sections must mesh with two concentric gears having different number of teeth, the two parts must have two sets of teeth shifted by a predetermined angle relative to each other. The planet parts must also be positively coupled to transfer their full torque capacity from one part to the other. The two parts may be coupled directly to one another, or through a positive torque transmission such as a keyed shaft or sleeve. The following are methods of construction realizing these objectives.

CONSTRUCTION METHOD #1

Two planet parts are mounted on a common axle, or hollow sleeve, angularly rotated to the appropriate phase shift of ip/n and then fixed permanently in relation to each other. FIG. 4a shows a ½ pitch shift. The fixing is preferably done by a joining process that does not disturb the integrity of the finished planet parts, such as by bonding, or, welding by an electron or laser beam. FIG. 4b shows a bonded compound planet 42, and FIG. 4c shows a welded compound planet 42.

Alignment prior to bonding may be done by any conventional method. For example, the gears 38 and 40 may be used as templates, with at least one tooth of each gear aligned, and the two unbonded planet parts may be located at the desired meshing location, hence getting their phase relationship directly from gears 38 and 40. Indexing divides may also be used to provide the desired angular phase shift between the two planet parts before fixing.

CONSTRUCTION METHOD #2

Two planet parts or sections are provided with a splined bore and are slidably mounted on a mating splined shaft or hollow sleeve. The angular pitch of the splined shaft is p/n (the tooth pitch of the planet divided by the number of gear planets in one group). FIG. 4d shows one part of a compound gear planet 42 constructed with n=3.

When mated with a similar part, tooth shifts of p/3 or 2p/3 are attained, depending on whether teeth B or C are aligned, respectively, for two planet parts. When the teeth, designated similarly, are aligned, an equivalent of a single gear planet is constructed. This method is suitable when n is a small number and the pitch p is large. Otherwise, the spline pitch p/n becomes too fine to carry the torque of the gear planets.

CONSTRUCTION METHOD #3

This is similar to Method #2 except that the spline has a number of teeth that is a multiple of n, and the number of planet teeth is not a multiple of n. The splined hollow may be replaced by any type of guideways accepting mechanical inserts that transmit shearing forces between the two planet parts, such as pins and keys.

EXAMPLE

If $Z_2=99$, $Z_1=96$ and 12 planets are used, then $s=Z_2-Z_1=3$ and $n=12/3=4$ hence, 3 planet groups are required and each group includes 4 planets having tooth shifts of p/4, p/2, 3p/4, p (i.e. aligned as a single gear), respectively. The number of teeth in the spline should be a multiple of n=4 such as 4,8,12, ... etc. Conversely, the number of teeth of the planet should not be any of these numbers. The condition of n=4 and $Z_3=15$ is illustrated in FIGS. 4a and 4e.

Accordingly, with reference to FIGS. 4a and 4e, the compound gear planets can be assembled on a common axle with the desired angular shift by having a common spline tooth, or a single common key, engage a corresponding keyway in one part, at D, for example, and in the second part at E for a p/4 shift; at F, for a p/2 shift, at G for a 3p/4 shift, or at D for a zero shift. FIG. 4a shows the condition of aligning a slot of one planet part with a slot of the other planet part to obtain a p/2 phase shift.

With Method #3, a single mechanical key may be used on the axle to mate with cavities of the splined bore of the planet parts, or, a fully splined shaft may be used allowing high torques to be transmitted by the planets.

Figure 4F:
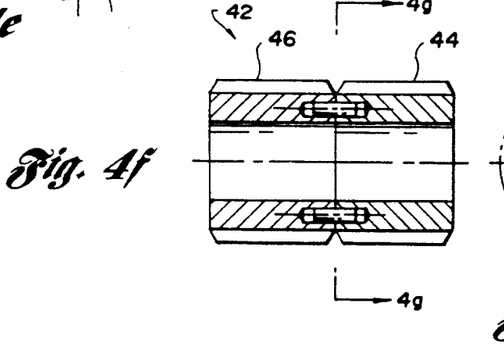
FIG. 4f is a side sectional view of a gear planet having its sections connected together by pins.
Figure 4G:
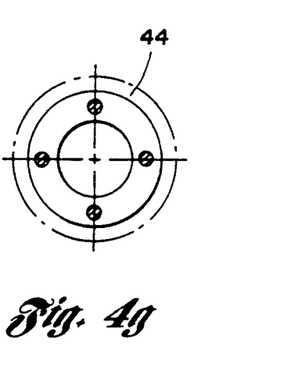
FIG. 4g is a view taken along lines 4g—4g in FIG. 4f.

Alternately, engaging one or multiple pins, with a number of holes, n, in the mating faces of two planet parts as illustrated in FIGS. 4f and 4g, provides the same phasing results. Radial keyways may also be cut in mating surfaces and keyed by one or multiple keys.

BACKLASH ELIMINATION

Backlash may be eliminated by any of well known methods such as by mounting the gear planets on eccentric shafts wherein the displacement of the shaft moves the gear planets radially inward or outward to bring their teeth closer to the mating input and output gears.

Figure 4H:
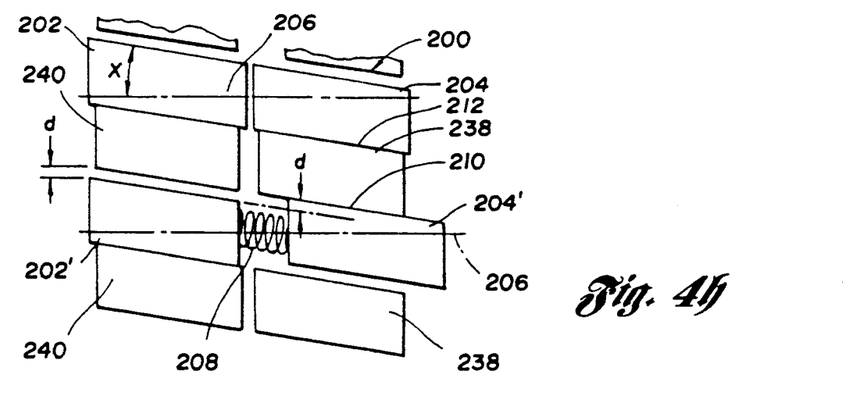
FIG. 4h is a side view of reducer gearing modified to eliminate backlash.

In a preferred embodiment, a reducer gearing generally indicated at 200 in FIG. 4h, has a helical gear geometry with helix angle X. Gear planet parts 202 and 204 are mounted on a splined axle allowing axial movement parallel to an axis 206. At least one planet has an axial spring 208 forcing the two planet sections or parts 202' and 204' apart (or together).

When assembled with mating gears 238 and 240, the planet parts are forced by the spring 208 to engage opposite faces 210 and 212 of the mating gears 238 and 240, hence eliminating backlash. A backlash margin of d is indicated in FIG. 4h.

LOAD SHARING AMONG COMPOUND PLANETS

To realize the maximum load capacity of a planetary type reducer with multiple planets, the load torque must be shared evenly by all of the planets. Numerous parameters such as tooth size, tooth spacing, bearing raceway eccentricity, and center distance place practical limits on the amount of precision which can be achieved and ultimately result in uneven load distribution.

Incorporating a fixed backlash adjustment at each compound planet, by methods previously described, can help distribute the load more evenly among the compound planets. The amount of load sharing which results is limited since effects of varying backlash, such as that which results from bearing raceway eccentricity, have not been accommodated.

Figure 4I:
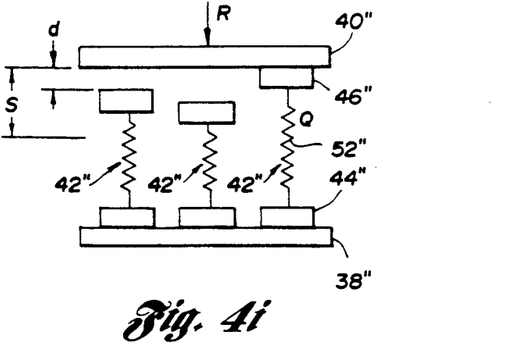
FIG. 4i is a schematic view of a gear planet wherein torsional displacements are represented by linear displacements.

A preferred embodiment is shown schematically in FIG. 4i wherein elements corresponding to FIG. 4c are given the same numeral with double prime designation, and wherein torsional displacements are represented by linear displacements. A predetermined amount of angular compliance Q is incorporated between the two planet parts 44'' and 46'' of each compound planet 42''. When a load R is applied to the output gear 40'', the resultant angular deflection S between the output gear 40'' and the reaction gear 38'' allows additional compound planets to support the load as the backlash d of each compound planet is eliminated. The magnitude of angular compliance is optimized with consideration given to the amount of load sharing and the resultant drive train torsional stiffness.

A method of construction for the compound planet which provides angular compliance between planet parts 44 and 46 is shown in FIG. 4c. The welds which fix the planet parts to the axle 52 are at the outside faces of the planet parts 44 and 46. The axle 52 acts as a torsion bar which will deflect under load. When the planet part 46 is subjected to a torsional load T with the planet part 44 fixed, the amount of angular deflection U of planet part 46 can be controlled by selection of: axle length between welds, L, axle diameter, D, and material modulus of rigidity, G, according to the torsional deflection relationship:

$$U = T \times Q$$

$$Q = \frac{L}{G \times J}$$

$$J = \frac{\pi \times D^4}{32} \text{ for a solid round section}$$

The robotic rotary joint described above has a bearing with a combination of one or more of the following functional capabilities:
  Built in high speed reducer with hollow core;
  Built in motor;
  Built in encoder;
  Built in brake;
  Built in circuit board having electronic components thereon.

Such a rotary joint integrates all critical robot design elements into one module that can be optimized for power, compactness, reliability, and cost. It also allows the robot designer a high level of modularity which improves robot reliability, cost, maintenance, and serviceability.

In general, the invention may be practiced with any planetary gear reducer having a high speed carrier that may also carry the rotor of an electric motor. Accordingly, single stage planetary reducers having one sun, or internal, gear is equally suitable for this invention though providing a lower speed reduction ratio and requiring a motor designed for a lower rotational speed than may be required for reducers having high reduction ratios.

Accordingly, by virtue of such a rotary joint, a new method for constructing modular robots is thus allowed. Such a modular robot is generally indicated at 132 in FIG. 8, wherein rotary joint modules constructed in accordance with the present invention are indicated by reference numerals 134, 136, 138, 140, 142 and 144 and join structural robotic elements indicated by reference numerals 146, 148, 150, 152, 154 and 156 in a serial arrangement to comprise the modular robot 132 of an articulate geometry. With this method, only bolted interfaces join the joint modules 132 through 144, to the structural elements, 146 through 156, of the robot arms. The hollow centers of the modules allow convenient routing of electric and service lines 158 to the joint modules 134 through 144, through the structural elements 146 through 156 and to an end-effector 160, located at the terminal end of the robot 132.

Figure 9A:
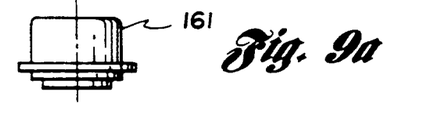
FIGS. 9a—9k are different views of basic robot structural modules for use in constructing modular robots in accordance with the present invention.

FIGS. 9a through 9k illustrate basic robot structural modules with a rotary robot joint module 161 illustrated in FIG. 9a.

Figure 9B:
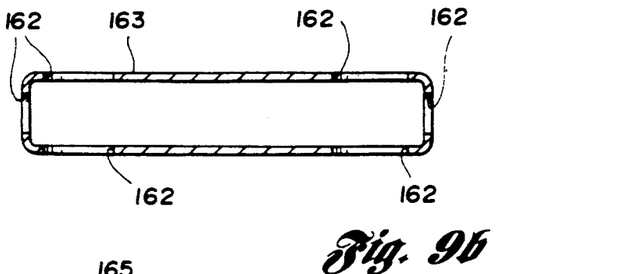
Figure 9C:
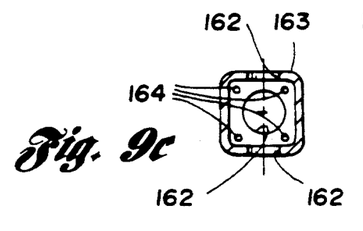

A module 163 of FIGS. 9b and 9c (end view of the module of FIG. 9b) is an elongated, hollow, structural beam that can serve as a robot arm when coupled to the robot joint at least at one of its ends. Holes 162 can be provided in the wall of the hollow beam for centering the rotary robot joint either at a side or an end wall. Such holes 162 also are surrounded with smaller holes 164 for coupling the rotary joint to the structural module 163 by means of threaded fasteners or the like.

Such structural module can be coupled to the second housing part 30 of the rotary joint 20 and securely fastened such as by threaded fasteners inserted into threaded holes.

Figure 9D:
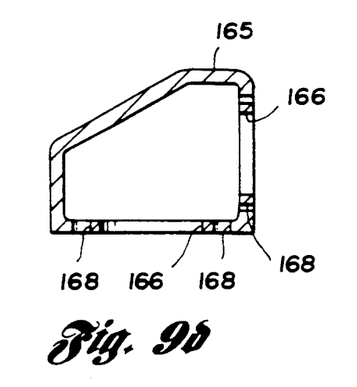
Figure 9E:
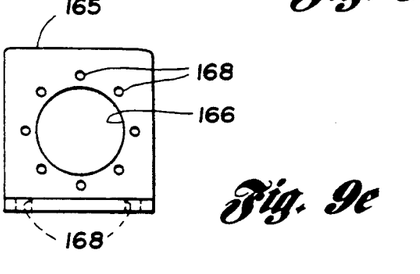

A structural module or element 165 of FIGS. 9d and 9e (end view of FIG. 9d) is a housing element that allows two rotary joints to have orthogonal axes by means of holes 166. Holes 168 allow the structural element 165 to be mounted.

Figure 9F:
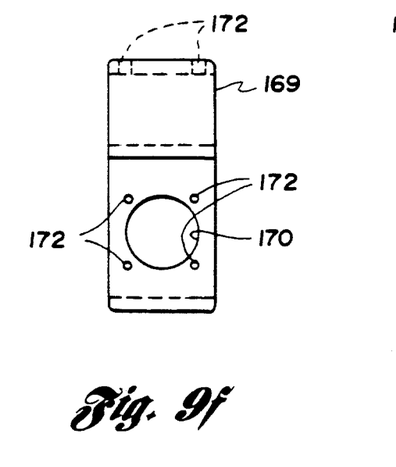
Figure 9G:
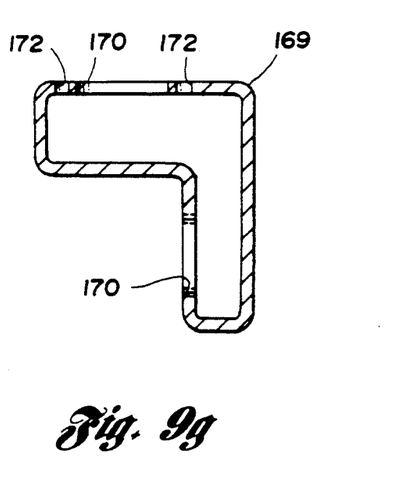

A structural module or element 169 of FIGS. 9f and 9g allows two offset parallel axes to be made collinear by means of holes 170. Holes 172 allow this structural element 169 to be mounted.

Figures 9H, 9I, 9J, 9K, 10A:
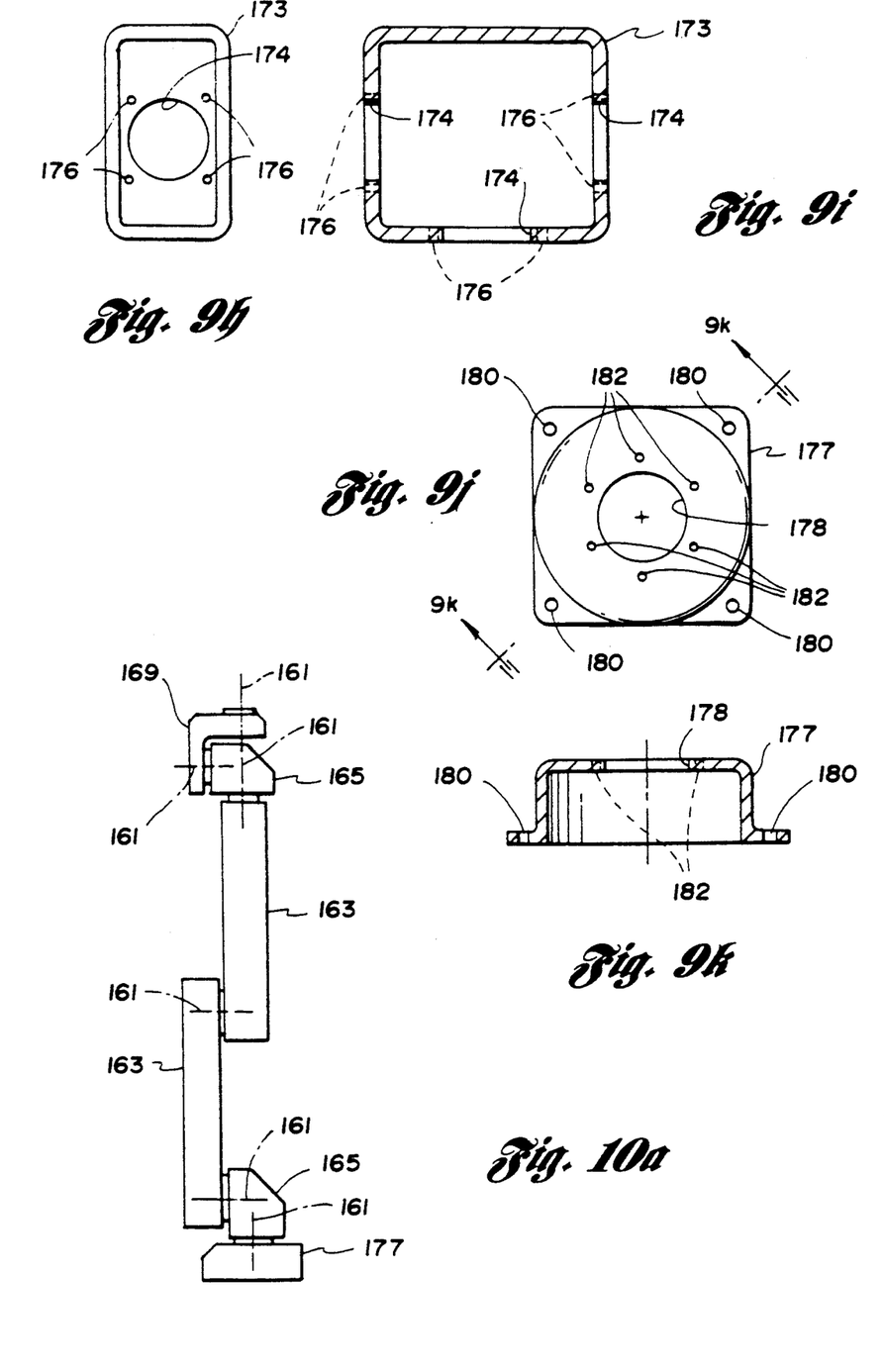
FIGS. 10a—10f are side elevational views illustrating examples of various types of modular robots built in accordance with the present invention.

A structural element or module 173 of FIGS. 9h and 9i is a hollow structural box that may house three rotary joints to provide a base joint for a robot. Holes 174 provide for the rotary joints and holes 176 allows the structural element 173 to be mounted.

Finally, a structural module or element 177 of FIGS. 9j and 9k is a base module which may be used to mount other robot modules adjacent central hole 178 by holes 182 and provides a supporting base for the robot which may be bolted to a floor through holes 180.

Any of the six modules 161, 163, 165, 169, 173 or 177 described with respect to FIGS. 9a through 9k can house one or more rotary joints or be externally attached to a rotary joint of the present invention. The dimensions of the modules may change to accommodate different robot and joint sizes, but the basic constructional geometry can generally remain the same as described. The holes in the modules may be machined as the need for a specific robot configuration arises rather than have the modules built to accommodate all mounting variations.

Figure 10B:
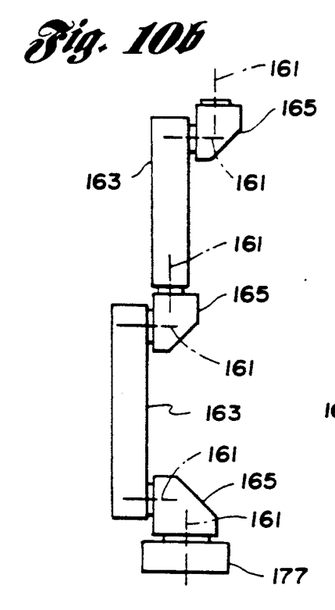
Figure 10C:
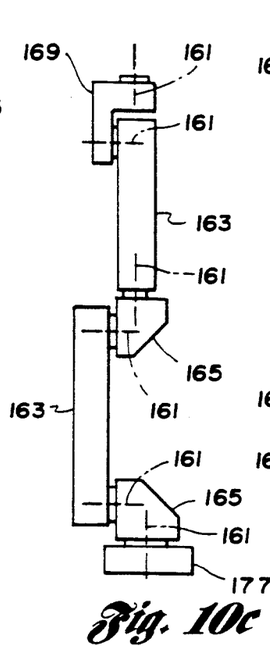

FIGS. 10a through 10f show examples of typical robot configurations as modularly built using the teachings of the invention. FIGS. 10a, 10b, and 10c show robots with serial linkages constructed from the basic modules 161, 163, 165, 169 and 177. The modules 163, 165, 169 and 177 are identified as well as the rotary robot joint modules 161 by their central axes of rotation.

FIGS. 10a and 10c show robots with an in-line wrist, while FIG. 10b shows a robot with an offset wrist.

Figure 10D:
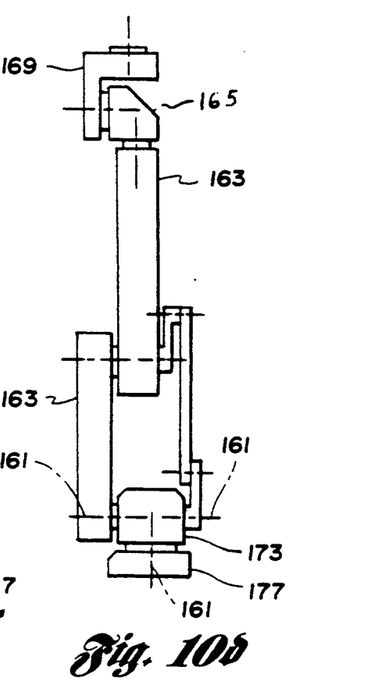

FIG. 10d shows a robot with an in-line wrist having one parallel link drive for its third axis, and utilizing the 3-axis base module 173.

Figures 10E, 10F:
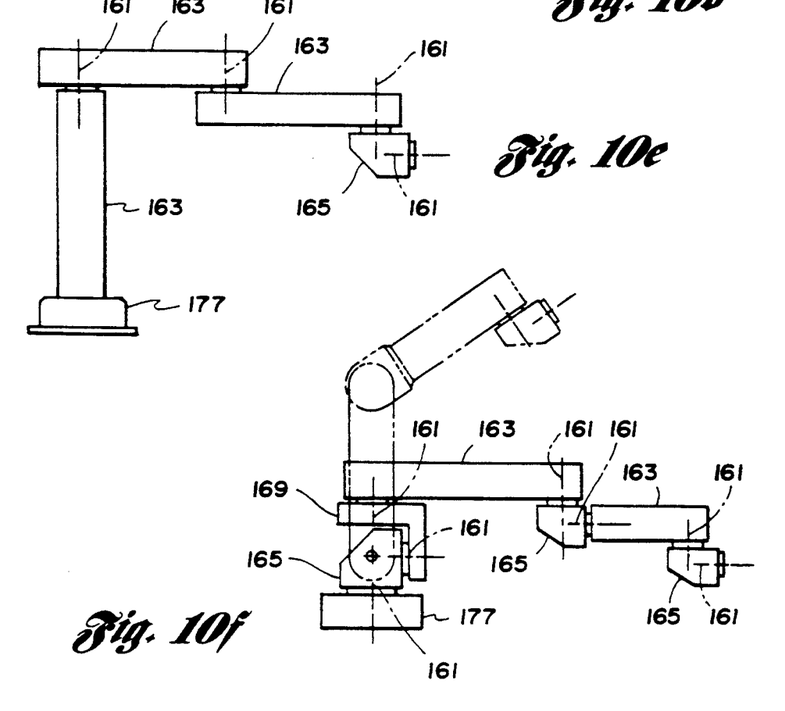

FIG. 10e shows a 4-joint SCARA arm robot utilizing the modules 161, 163, 165 and 177.

FIG. 10f depicts a robot with axes redundancy (i.e., more than 6), that can be reconfigured to articulate in multiple planes by rotation about its second axis as illustrated by phantom lines.

A robot constructed from such simple structural modules and such an integrated rotary robot joint module is easy to maintain and service mechanically and electrically and has a minimum number of simple custom-built parts. Hence, a robot can be built expeditiously with low manufacturing cost.

It should also be obvious that the invention provides a versatile method for the simple, low-cost, construction of complex robots.

While the best mode for carrying out the invention has been described in detail, those familiar with the art to which this invention relates will recognize various alternative designs and embodiments for practicing the invention as defined by the following claims.

What is claimed is:

1. A motorized rotary joint for driving a load coupled thereto, the joint comprising:
   a cylindrical power transmission having a central hole;
   an electric motor in driving engagement with the power transmission for driving the power transmission;
   a hollow housing having an outside dimension and an inside dimension, the housing including first and second housing parts for housing the power transmission and the motor wherein one of the first and second housing parts is adapted to be coupled to the load;
   first bearing means disposed between the first and second housing parts for allowing relative rotary movement between the first and second housing parts to drive the load; and
   second bearing means disposed within the housing for rotatably supporting the power transmission and the motor wherein the rotary joint provides a central hollow core for passing service lines therethrough and wherein the inside dimension is relatively large in relation to the outside diameter and wherein the electric motor includes a stator supported on one of the housing parts within the housing and a rotor wherein the second bearing means rotatably supports the rotor and wherein the rotor is supported on the power transmission within the housing and wherein the power transmission is a planetary type speed reducer including a carrier and wherein the carrier also supports the rotor.

2. The joint as claimed in claim 1 further comprising means mounted within the housing and electrically coupled to the rotor for supplying electrical energy to the rotor.

3. The joint as claimed in claim 1 or claim 4 further comprising an encoder mounted in the housing for providing a feedback signal representative of the angular displacement between the first and second housing parts.

4. The joint as claimed in claim 3 further comprising a brake mounted in the housing for braking the relative rotation between the first and second housing parts in response to a braking control signal.

5. An intelligent, motorized rotary joint for driving a load coupled thereto, the joint comprising:
   a cylindrical power transmission;
   a motor in driving engagement with the power transmission for driving the power transmission;
   a circuit board having electronic components thereon for receiving electrical power and control signals and driving the motor in response to the control signals;
   a housing including first and second housing parts for housing the power transmission, the motor, and the circuit board wherein one of the first and second housing parts is adapted to be coupled to the load;
   first bearing means disposed between the first and second housing part for allowing relative rotational movement between the first and second housing parts to drive the load; and
   second bearing means disposed within the housing for rotatably supporting the power transmission and the motor.

6. The joint of claim 5 further comprising an encoder mounted in the housing for providing a feedback signal representative of the angular displacement between the first and second housing parts wherein the electrical components include means for receiving the feedback signal so that the electrical components provide closed loop control of the motor.

7. The joint of claim 5 or claim 6 wherein the electrical components include a communication circuit adapted to receive the electrical control signals from an external programmed controller and provide corresponding command signals in response thereto.

8. The joint of claim 7 wherein the electrical components include a programmed microcomputer and a motor drive circuit for controllably driving the motor, the programmed microcomputer processing the command signals to provide circuit control signals to the motor control circuit, the motor drive circuit driving the motor in response to the circuit control signals.

9. The joint of claim 8 further comprising a brake mounted in the housing for braking the relative rotation between the first and second housing parts in response to a braking control signal generated by the electronic components.

10. The joint of claim 5 wherein the transmission has a central hole extending completely therethrough and the housing is hollow, the hollow housing having an outside dimension and an inside dimension and wherein the rotary joint provides a central hollow core for passing service lines therethrough, and wherein the inside dimension is relatively large in relation to the outside dimension.

11. A method for constructing a modular robot having at least one axis of rotation, the method comprising the steps of:

providing a rotary joint of claim 1 or claim 5 for each axis of rotation;

providing a hollow structural module including a wall with a hole extending therethrough for each rotary joint;

aligning the hole of each structural module with the central hollow core of its corresponding joint;

securing each structural module to its corresponding rotary joint; and routing at least one electrical cable through the hole of each structural module and each corresponding aligned central hollow core to energize and communicate electrically with each rotary joint such that the robot can be powered and controlled.

12. The method as claimed in claim 11 wherein the step of aligning includes the step of disposing the rotary joint within its corresponding structural module.

* * * * *

UNITED STATES PATENT AND TRADEMARK OFFICE
CERTIFICATE OF CORRECTION

PATENT NO. : 5,293,107
DATED : March 8, 1994
INVENTOR(S) : Hadi A. Akeel

It is certified that error appears in the above-identified patent and that said Letters Patent is hereby corrected as shown below:

Column 1, line 32
before "mechanical" insert --with--;

Column 1, line 62
before "controls" insert --servo--;

Column 4, lines 15-17
  after "loads; and" insert --has inherently low manufacturing cost.--;

Column 9, line 45
before "such" insert --element--; and

Column 14, line 14     after
"claim 1 or" replace "claim 4" with --claim 2--.

Signed and Sealed this

Sixth Day of September, 1994

*Attest:*

BRUCE LEHMAN

*Attesting Officer*      *Commissioner of Patents and Trademarks*